United States Patent
Le et al.

(10) Patent No.: US 11,159,443 B2
(45) Date of Patent: *Oct. 26, 2021

(54) QUEUE MANAGEMENT IN A FORWARDER

(71) Applicant: International Business Machines Corporation, Armonk, NY (US)

(72) Inventors: Thai Franck Le, White Plains, NY (US); Erich M Nahum, New York, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 117 days.

This patent is subject to a terminal disclaimer.

(21) Appl. No.: 16/527,310

(22) Filed: Jul. 31, 2019

(65) Prior Publication Data

US 2020/0099627 A1 Mar. 26, 2020

Related U.S. Application Data

(63) Continuation of application No. 15/689,103, filed on Aug. 29, 2017, now Pat. No. 10,432,546, which is a
(Continued)

(51) Int. Cl.
*G01R 31/08* (2020.01)
*G06F 11/00* (2006.01)
(Continued)

(52) U.S. Cl.
CPC .......... *H04L 47/627* (2013.01); *H04L 47/32* (2013.01); *H04L 47/40* (2013.01); *H04L 47/6255* (2013.01); *H04L 47/6275* (2013.01)

(58) Field of Classification Search
CPC ....... H04L 47/627; H04L 47/32; H04L 47/40; H04L 47/6255; H04L 47/6275;
(Continued)

(56) References Cited

U.S. PATENT DOCUMENTS 6,421,342 B1 7/2002 Schwartz et al.
6,473,425 B1 * 10/2002 Bellaton ................. H04L 29/06
370/392

(Continued)

FOREIGN PATENT DOCUMENTS

EP   1175046 A2   1/2002
JP   2001-197063 A   7/2001

OTHER PUBLICATIONS

TCP/IP Illustrated vol. 1, The protocols. W. Richard Stevens. Addison-Wesley Publishing Co., copyrighted 1994, p. 224.*
(Continued)

*Primary Examiner* — Stephen M D Agosta
(74) *Attorney, Agent, or Firm* — Vazken Alexanian; McGinn I.P. Law Group, PPLC.

(57) ABSTRACT

A queue management method, system, and recording medium include Selective Acknowledgments (SACK) examining to examine SACK blocks of the forwarder to selectively drop packets in the forward flow queue based on a reverse flow queue and MultiPath Transmission Control Protocol (MPTCP) examining configured to examine multipath headers to recognize MPTCP flows and examine the reverse flow queue to determine if redundant data has been sent such that the dropping drops the redundant data.

10 Claims, 6 Drawing Sheets

Related U.S. Application Data continuation of application No. 14/969,871, filed on Dec. 15, 2015, now Pat. No. 9,843,530.

(51) Int. Cl.

| | |
|---|---|
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/863* | (2013.01) |
| *H04L 12/823* | (2013.01) |
| *H04L 12/865* | (2013.01) |
| *H04L 12/893* | (2013.01) |

(58) Field of Classification Search
CPC ..... H04W 80/06; H04W 28/04; H04W 40/12; H04W 40/34; H04W 76/15; H04W 84/042; H04W 84/12; G06F 8/36; G06F 9/4411; G06F 9/4494; G06F 9/5005
See application file for complete search history.

(56) References Cited

U.S. PATENT DOCUMENTS

| | | | |
|---|---|---|---|
| 6,700,871 | B1 | 3/2004 | Harper et al. |
| 7,349,337 | B1 | 3/2008 | Mahdavi |
| 7,680,944 | B1 | 3/2010 | Taghizadeh et al. |
| 7,738,469 | B1* | 6/2010 | Shekokar ................ H04L 49/00 370/392 |
| 8,144,714 | B1 | 3/2012 | Buchko et al. |
| 9,350,672 | B2* | 5/2016 | Patwardhan .......... H04L 47/193 |
| 9,503,223 | B2* | 11/2016 | Wu ....................... H04L 1/1887 |
| 9,588,928 | B1 | 3/2017 | Swartzentruber |
| 9,602,330 | B1* | 3/2017 | Dickinson .............. H04L 69/16 |
| 9,871,723 | B2* | 1/2018 | Teyeb ..................... H04L 45/24 |
| 10,397,379 | B2* | 8/2019 | Paasch .................... H04L 69/14 |
| 2003/0149785 | A1 | 8/2003 | Gerla et al. |
| 2004/0006643 | A1 | 1/2004 | Dolson et al. |
| 2005/0068896 | A1* | 3/2005 | Pazos ...................... H04L 29/06 370/235 |
| 2008/0037420 | A1 | 2/2008 | Tang |
| 2008/0081579 | A1 | 4/2008 | Chen et al. |
| 2008/0209297 | A1 | 8/2008 | Chandra et al. |
| 2008/0212613 | A1 | 9/2008 | Perkinson et al. |
| 2010/0020689 | A1 | 1/2010 | Tang |
| 2010/0232427 | A1 | 9/2010 | Matsushita et al. |
| 2012/0144062 | A1 | 6/2012 | Livet et al. |
| 2012/0155468 | A1 | 6/2012 | Greenberg et al. |
| 2012/0226802 | A1* | 9/2012 | Wu ........................ H04L 47/27 709/224 |
| 2013/0077501 | A1 | 3/2013 | Krishnaswamy et al. |
| 2013/0308458 | A1 | 11/2013 | Francini |
| 2014/0064119 | A1 | 3/2014 | Iizuka et al. |
| 2014/0153574 | A1* | 6/2014 | Louzoun ................ H04L 1/188 370/392 |
| 2014/0247718 | A1 | 9/2014 | Mogul et al. |
| 2014/0269269 | A1* | 9/2014 | Kovvali ................ H04W 24/04 370/229 |
| 2014/0351447 | A1* | 11/2014 | Annamalaisami ...... H04L 69/14 709/227 |
| 2015/0026756 | A1* | 1/2015 | Reddy .................... H04L 29/06 726/1 |
| 2015/0201046 | A1* | 7/2015 | Biswas ................. H04L 69/321 370/329 |
| 2015/0281367 | A1* | 10/2015 | Nygren ............... H04L 65/1066 709/228 |
| 2016/0308775 | A1* | 10/2016 | Kojima ................. H04L 47/193 |
| 2017/0105138 | A1* | 4/2017 | Huang ................... H04W 28/04 |
| 2017/0187629 | A1* | 6/2017 | Shalev ................... H04L 69/10 |
| 2018/0115490 | A1* | 4/2018 | Kawasaki ........... H04L 47/2483 |

OTHER PUBLICATIONS

MPTCP RFC 68214, published Mar. 2013, pp. 1-64.*
Mel, et al. "The NIST Definition of Cloud Computing". Recommendations of the National Institite of Standards and Technology. Nov. 16, 2015.
United States Notice of Allowance dated May 21, 2019, in U.S. Appl. No. 15/689,103.
United States Office Action dated Apr. 23, 2019, in U.S. Appl. No. 15/689,103.
United States Office Action dated Mar. 6, 2019, in U.S. Appl. No. 15/689,103.
United States Office Action dated Feb. 8, 2019 in U.S. Appl. No. 15/689,103.
United States Notice of Allowance dated Aug. 4, 2017, in U.S. Appl. No. 14/969,871.
United States Office Action dated Jul. 5, 2017, in U.S. Appl. No. 14/969,871.
United States Office Action dated May 10, 2017, in U.S. Appl. No. 14/969,871.

* cited by examiner

QUEUE MANAGEMENT IN A FORWARDER

CROSS-REFERENCE TO RELATED APPLICATIONS

The present application is a Continuation Application of U.S. patent application Ser. No. 15/689,103, filed on Aug. 29, 2017, which is Continuation Application of U.S. patent application Ser. No. 14/969,871, now U.S. Pat. No. 9,843,530 issued on Dec. 12, 2017, the entire contents of which are hereby incorporated by reference.

STATEMENT REGARDING FEDERALLY SPONSORED RESEARCH OR DEVELOPMENT

This invention was made with Government support under W911NF-06-3-0001 awarded by the Army Research Office (ARO). The Government has certain rights to this invention.

BACKGROUND

The present invention relates generally to queue management in networking devices such as bridges, routers, and certain types of network function appliances, but not by way of limitation, to a system, a method, and a recording medium for queue management using information contained in packets traversing a reverse path from a forwarder to intelligently select which packets in queue to drop.

Many conventional techniques exist to manage queues in networks and are categorized as Active Queue Management (AQM). The AQM techniques attempt to drop packets intelligently so as to improve throughput and reduce delay.

That is, conventional techniques include, for example, drop tail, Random Early Drop (RED), the proportional integral (PI) controller, Stochastic Fairness Queuing (SFQ), and Controlled Delay (CoDel). The common theme in these techniques is that the techniques only consider information related to simplex (single-directional) flows, such as queue length, arrival time, or packet markings.

Thus, the present inventors have recognized that the above conventional techniques, and other conventional techniques, are limited in their applications in that the techniques only utilize single-directional flow parameters to manage queues and do not consider information available in the corresponding reverse flow as a way to determine which packets to drop. Thus, when forced to drop a packet, the conventional techniques frequently drop a useful packet instead of a redundant one.

SUMMARY

In an exemplary embodiment, the present invention can provide a queue management system, including a queue examining device configured to examine a reverse flow queue from a forwarder for an acknowledged packet and a dropping device configured to drop a packet in a forward flow queue if the packet in the forward flow queue includes the acknowledged packet in the reverse flow queue.

Further, in another exemplary embodiment, the present invention can provide a queue management method, including examining a reverse flow queue from a forwarder for an acknowledged packet and dropping a packet in a forward flow queue if the packet in the forward flow queue includes the acknowledged packet in the reverse flow queue.

Even further, in another exemplary embodiment, the present invention can provide a non-transitory computer-readable recording medium recording a queue management program, the program causing a computer to perform: examining a reverse flow queue from a forwarder for an acknowledged packet and dropping a packet in a forward flow queue if the packet in the forward flow queue includes the acknowledged packet in the reverse flow queue.

There has thus been outlined, rather broadly, exemplary embodiments of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION

Figure 1:
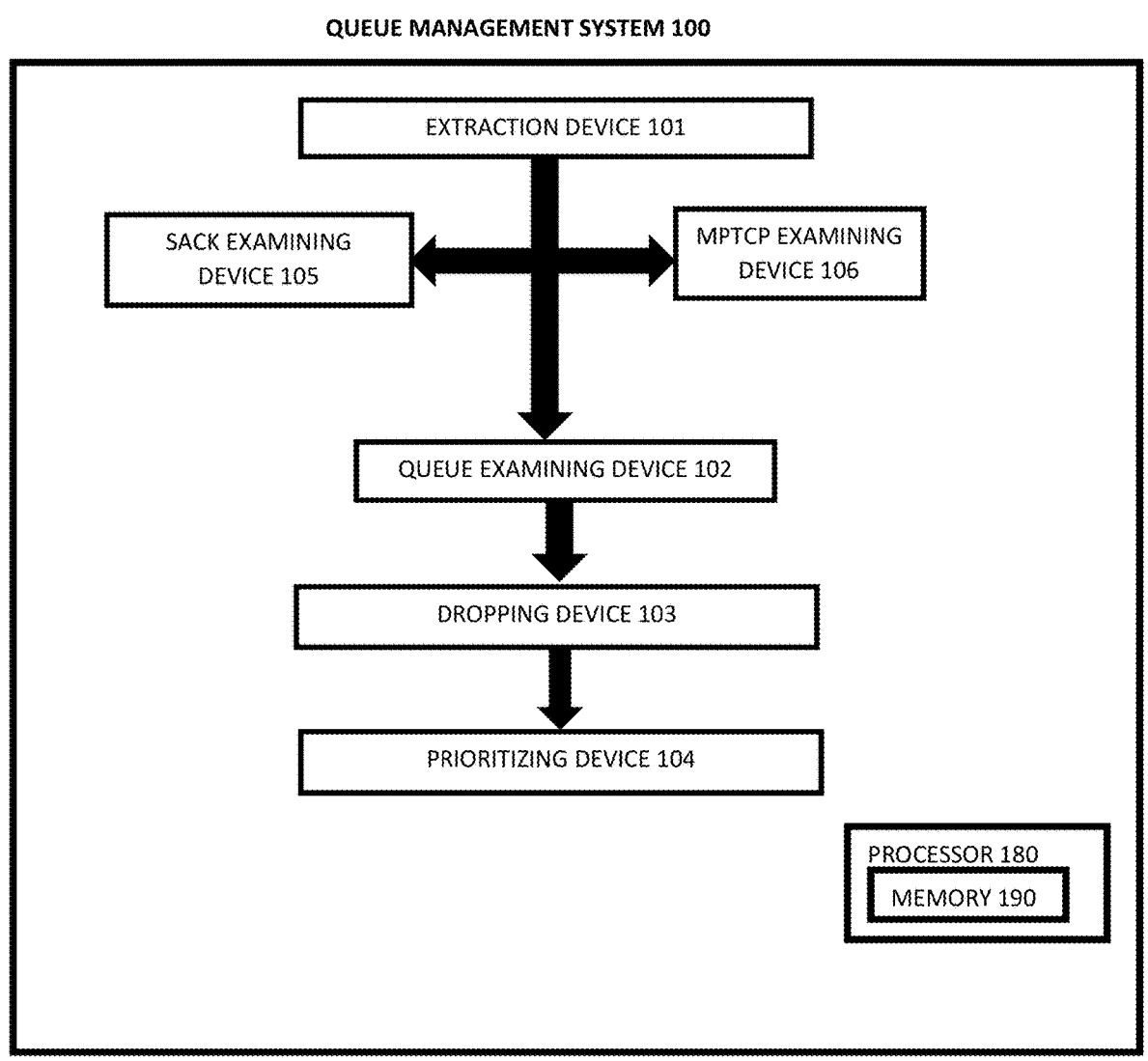
FIG. 1 exemplarily shows a block diagram illustrating a configuration of a queue management system 100.

The invention will now be described with reference to FIGS. 1-6 in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the queue management system 100 includes an extraction device 101, a queue examining device 102, a dropping device 103, a prioritizing device 104, a Transmission Control Protocol (TCP) Selective Acknowledgments (SACK) device 105, and a multipath TCP (MPTCP) device 106. The queue management system 100 includes a processor 180 and a memory 190, with the memory 190 storing instructions to cause the processor 180 to execute each device of the queue management system 100.

It should be noted that the forwarder 300 is used in exemplary illustrations of the invention as a specific type of middlebox. However, the invention is not limited thereto. That is, forwarder 300 refers to networking devices such as bridges, routers, and certain types of network function appliances which are frequently termed middleboxes in the networking art.

Figure 5:
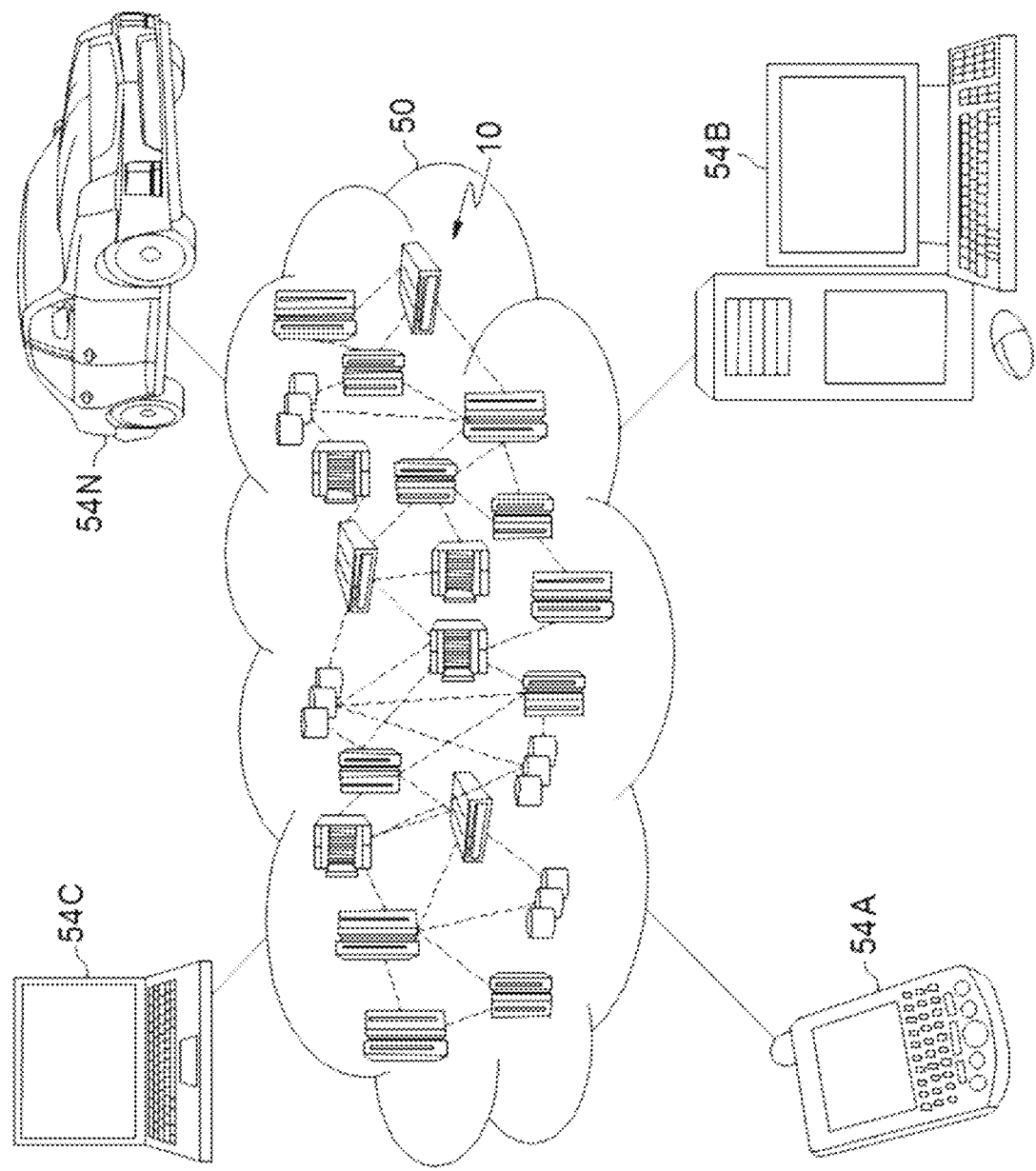
FIG. 5 depicts a cloud computing environment according to another embodiment of the present invention.
Figure 6:
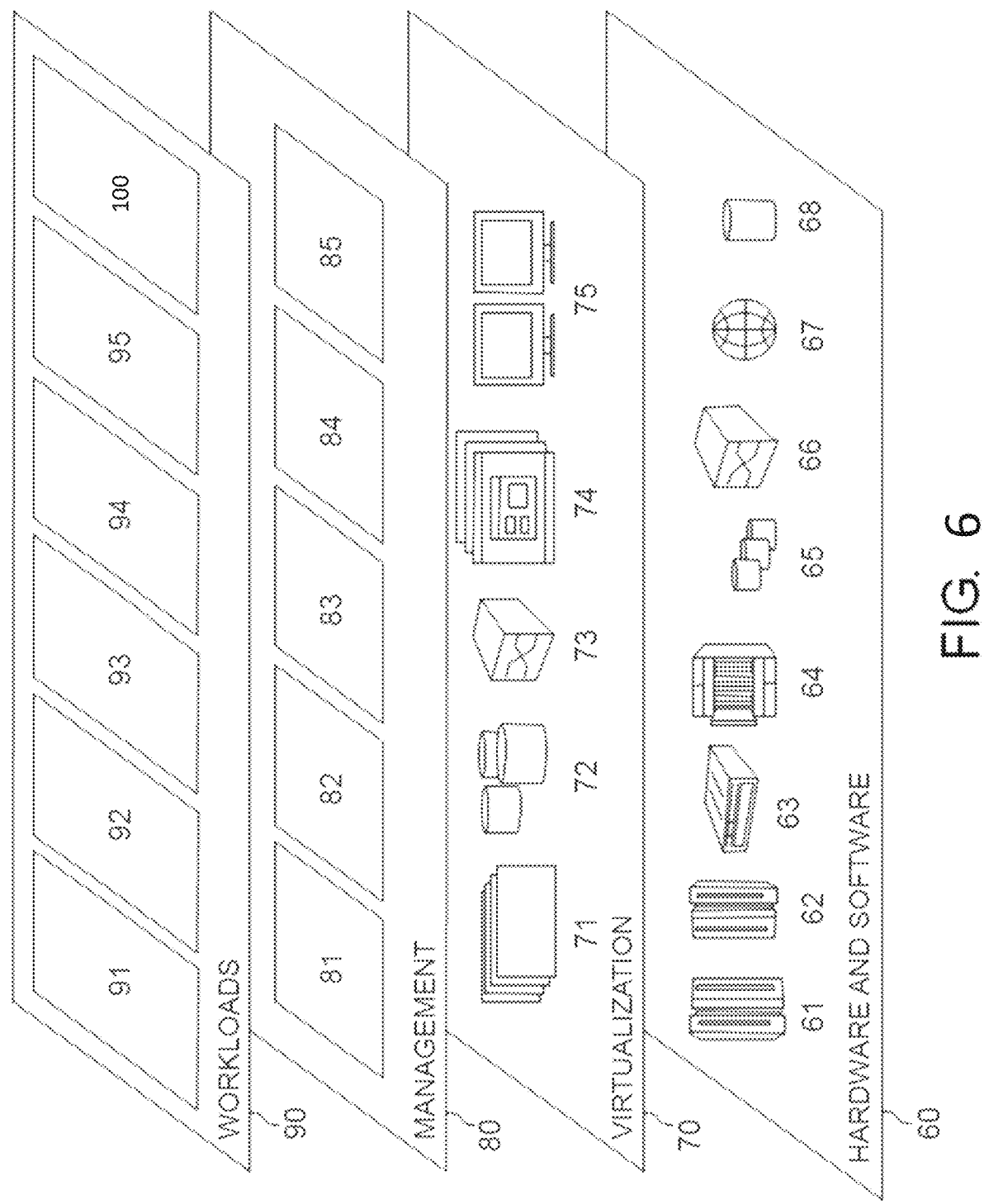
FIG. 6 depicts abstraction model layers according to an embodiment of the present invention.

Although as shown in FIGS. 5-7 and as described later, the computer system/server 12 is exemplarily shown in cloud computing node 10 as a general-purpose computing device which may execute in a layer the queue management systems 100 (FIG. 7), it is noted that the present invention can be implemented outside of the cloud environment.

Figure 3:
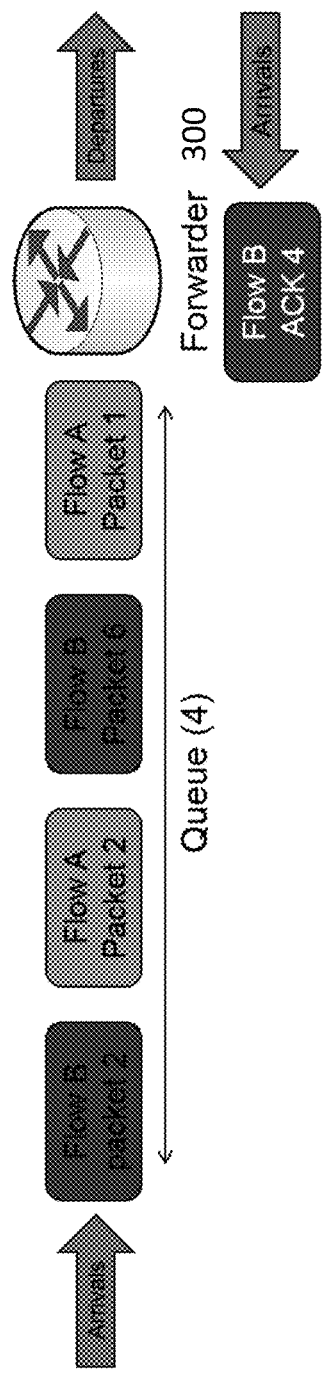
FIG. 3 exemplarily shows a queue at a forwarder.

FIG. 3 exemplarily depicts a forwarder 300 which has a queue of packets arriving thereto. FIG. 3 also exemplarily depicts the forwarder 300 sending an acknowledgment signal back (i.e., along a reverse path) to the prior forwarder or device which sent the packets in queue. That is, the forwarder 300 can simultaneously receive packets and send an acknowledgement of the packets along the reverse path.

The extraction device 101 extracts acknowledgement information from the arriving packets arriving at the forwarder 300. Upon receipt of any TCP packet that contains an acknowledgement, certain information about the packet is extracted, for example, source and destination IP address, source and destination port number, and ACK number.

The queue examining device 102 examines the incoming queue as compared to the reverse flow queue of acknowledged packets. Each queue of outgoing packets is then examined by the queue examining device 102. For each packet in the queue, the packet is examined by the queue examining device 102 to determine if it belongs to a same TCP flow as specified in the ACK packet of the reverse flow. If true, the data sequence information is determined from the sequence information and the size of the data.

The dropping device 103 drops queued packets in the queue if they have already been acknowledged by the forwarder 300 as determined by the queue examining device 102. That is, if the data contained in the packet has already been acknowledged by the forwarder 300 (as indicated by the ACK), the packet is removed from the queue by the dropping device 103 and the memory is returned to the system.

Thus, the dropping device 103 drops retransmitted packets that are waiting to be queued and are not needed at the forwarder 300, rather than other packets which may still be needed.

The invention provides a solution in which information contained in packets traversing the reverse path may be dropped by the dropping device 103 to intelligently select which queued packets to erroneous drop to solve the problems in which memory can be exhausted, leading to drops of newly arriving packets. These packet drops slow down the corresponding TCP flows, which consider these drops congestion and slow their transmission rates. Response time experienced by the client increases, since the delay experienced by the packet (queuing delay) is added to the total delay of a response, which includes one or more packets. Senders may unnecessarily retransmit the packet, therein wasting bandwidth across the network. Delays can adversely interact with TCP retransmission timers, since the sender may believe the packet is dropped when it is in fact delayed.

Thus, as exemplarily shown in FIG. 3, packets 1-3 of FLOW B have been acknowledged by the forwarder 300 and the acknowledgment has been sent on the reverse flow. In this scenario, the dropping device 103 would drop FLOW B "packet 2" since this packet has already been received by the forwarder 300 and is a re-transmission of a previously acknowledged packet due to the size of the queue.

The prioritizing device 104 prioritizes the queues to be sent if a triple acknowledgement is seen. That is, while TCP mainly relies on timer expiration to decide to retransmit a packet that is presumed lost, there are other mechanisms that can accelerate this process. One is known as a "triple duplicate ACK". For example, a sequence of packets arriving at a receiver with the following sender packet sequence is 1,2,3,5,6,7. TCP interprets this to mean that packet 4 has been lost. The sender receives acknowledgements from the receiver for packets 1, 2, and 3. When packet 5 arrives at the forwarder 300, the forwarder 300 sends another acknowledgement for packet 3 to tell the sender it is missing 4. This is a duplicate ACK since it is a copy of a previously-sent ACK. The TCP protocol standard specifies that when three duplicate ACKs are received, the sender should interpret this to mean that the subsequent packet has been lost. In the case above, the sender retransmits packet 4.

Thus, the prioritizing device 104 can be used to reduce the time it takes to retransmit a packet in the following manner. The packet forwarder 300 keeps track of the state of the acknowledgements. When a triple duplicate ACK is seen, the queue examining device 102 can search its sending queue to see if the required packet (#4 in the case above) is in the queue. If it is in the queue, it can be prioritized by the prioritizing device 104 by moving that packet to the head of the queue so that it is next in line for transmission. This way, the receiver will get the retransmission earlier than if it had been waiting for the actual sender to retransmit the packet. In other words, the prioritizing device 104 will prioritize to send a packet if the reverse flow is determined not to contain the packet by the queue examining device 102.

The SACK examining device 105 examines SACK blocks to selectively drop packets. TCP includes an option for selective acknowledgements that can distinguish at a finer granularity exactly which packets have been received and which have not. Using the above example, a TCP receiver using SACK blocks can send a message back to the receiver that says ACK 3 SACK 5,6,7. This tells the packet forwarder 300 that packets 5-7 have been seen at the receiver and can thus be dropped from the packet forwarder's send queue by the SACK examining device 105.

The MPTCP examining device 106 examines multipath headers to recognize MPTCP flows. Multi-path TCP (MPTCP) is a TCP-compatible extension that allows use of multiple paths simultaneously (e.g., both your WiFi and your Longterm Evolution (LTE) on a cell phone). MPTCP breaks different paths into what are called subflows. Two different subflows will look different at first glance by just looking at the standard TCP and IP packet headers. However, if the MPTCP header is examined by the MPTCP examining device 106, the MPTCP examining device 106 can recognize when two subfloors are part of the same MPTCP connection, or superflow. Once the MPTCP examining device 106 becomes aware of MPTCP, then the MPTCP examining device 106 examines the queue to see if any redundant data has been sent on a different subflow.

Figure 2:
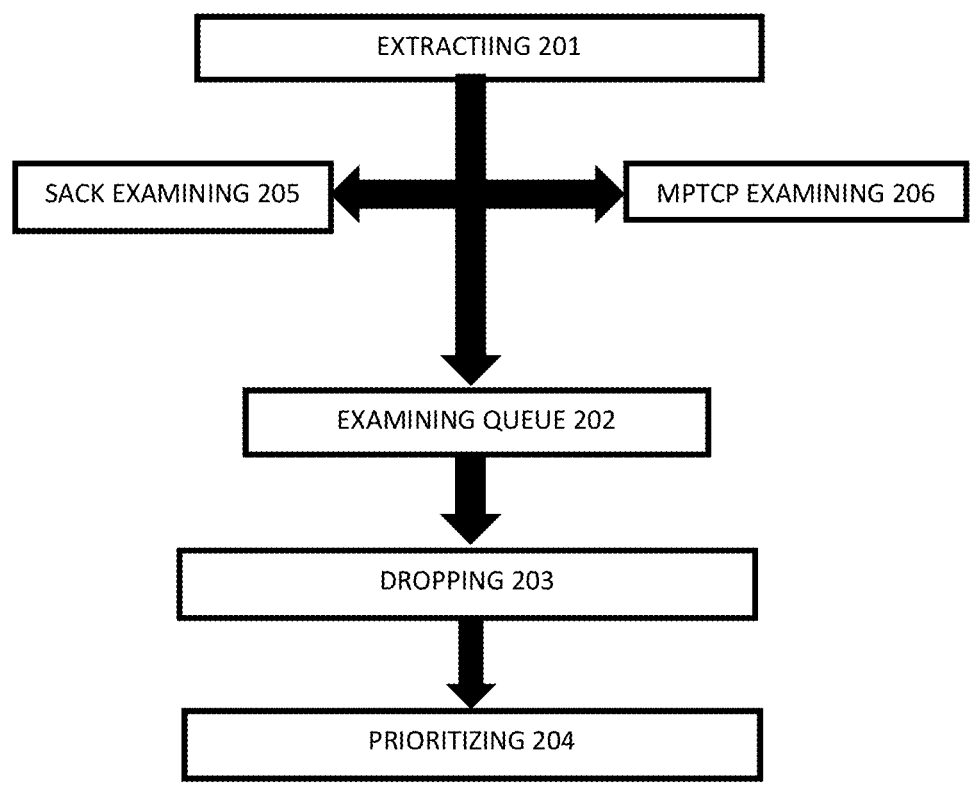
FIG. 2 exemplarily shows a high level flow chart for a queue management method 200.

FIG. 2 shows a high level flow chart for a queue management method 200.

Step 201 extracts the acknowledgement information from the arriving packets to the forwarder 300.

Step 202 examines the incoming queue as compared to the reverse flow queue of acknowledged packets. Then, each queue of outgoing packets is examined. For each packet in the queue, the packet is examined to determine if it belongs to a same TCP flow as specified in the ACK packet of the reverse flow. If true, then the data sequence information is determined from the sequence information and the size of the data.

Step 203 drops queued packets in the queue if they have already been acknowledged by the forwarder 300 as determined by Step 202.

After step 203, Step 204 prioritizes the queues to be sent if a triple acknowledgement is seen.

After step 203, Step 205 examines SACK blocks to selectively drop packets.

After step 203, Step 206 examines multipath headers to recognize MPTCP flows.

Step 204, Step 205, and Step 206 can be performed in any order and independently of one another.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a Shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
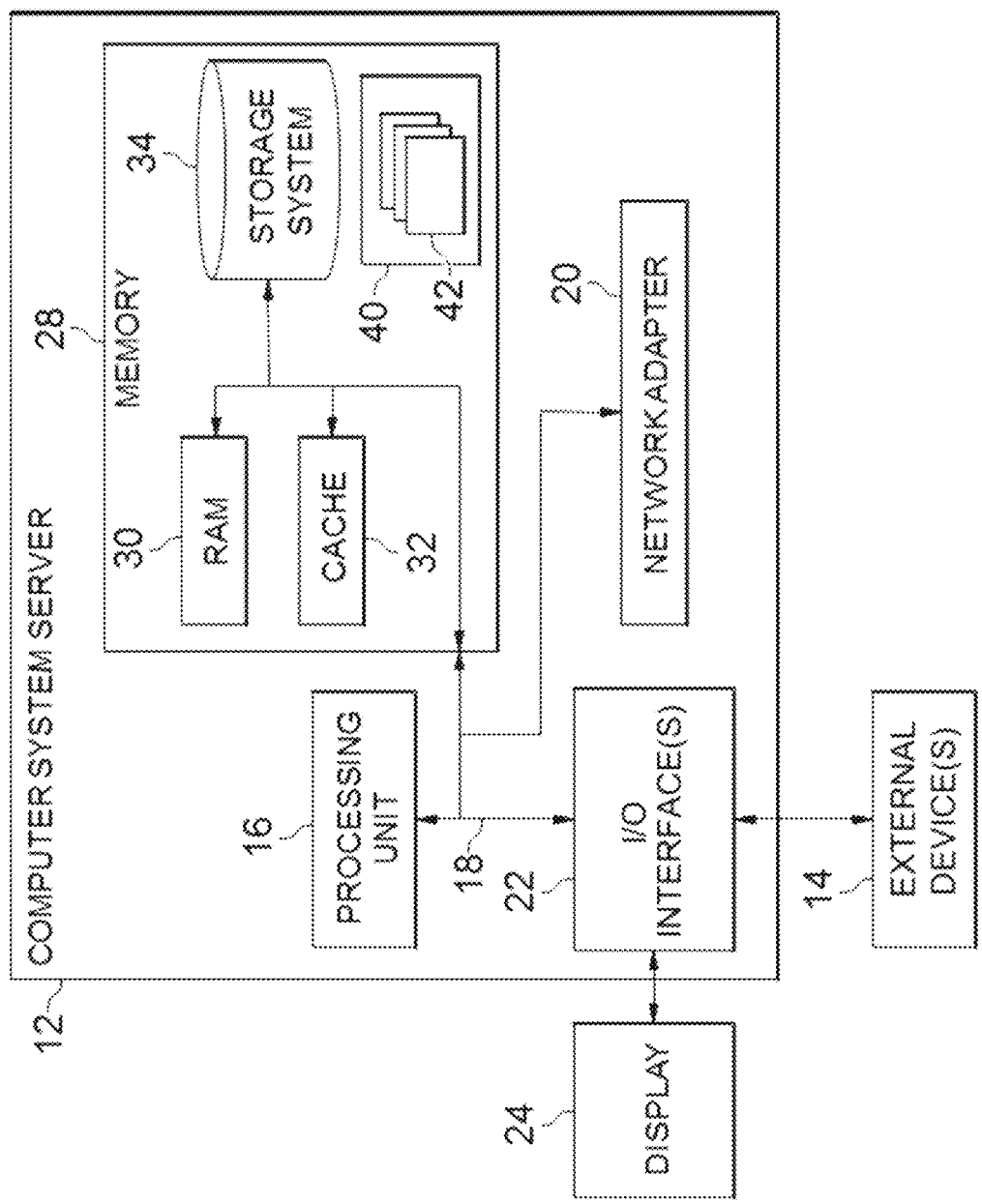
FIG. 4 depicts a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media, Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the queue management 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

In view of the foregoing and other problems, disadvantages, and drawbacks of the aforementioned conventional techniques, it is desirable to provide a new and improved queue management system, method, and non-transitory recording medium that, enables more efficient and intelligent choices in dropping packets to manage a queue.

What is claimed is:

1. A queue management system, comprising:
   a processor; and
   a memory, the memory storing instructions to cause the processor to execute:
   dropping a packet in a forward flow queue from a perspective sent from a forwarder to a receiver if the packet in the forward flow queue includes an acknowledged packet in a reverse flow queue from a perspective sent from a receiver back to the forwarder and returning allocated memory for the dropped packet to the system;
   prioritizing a first packet to be sent to the forwarder from the sender if the reverse flow queue from the receiver to the forwarder is determined not to include the first packet, the first packet being from a prior transmission;
   Selective Acknowledgments (SACK) examining to examine SACK blocks of the forwarder to selectively drop packets in the forward flow queue based on the reverse flow queue; and
   MultiPath Transmission Control Protocol (MPTCP) examining configured to examine multipath headers to recognize MPTCP flows and examine the reverse flow queue to determine if redundant data has been sent such that the dropping drops the redundant data,
   wherein the dropping drops the packet in the forward flow queue from the perspective sent from the forwarder to the receiver if the metadata of the packet does not match the metadata of the acknowledged packet.

2. The system of claim 1, further comprising extracting acknowledgement information from arriving packets in the forward flow queue at the forwarder.

3. The system of claim 2, further comprising examining the reverse flow queue from the forwarder for the acknowledged packet based on the acknowledgement information.

4. The system of claim 2, wherein the first packet is prioritized when a triple acknowledgement is detected for the first packet.

5. The system of claim 1, wherein the first packet is prioritized when a triple acknowledgement is detected for the first packet.

6. The system of claim 1, wherein the forwarder keeps track of a state of the acknowledged packet.

7. The system of claim 1, further comprising a Transmission Control Protocol (TCP) receiver using SACK blocks that communicates with the receiver about the acknowledged packet.

8. A queue management method, comprising:
   dropping a packet in a forward flow queue from a perspective sent from a forwarder to a receiver if the packet in the forward flow queue includes an acknowledged packet in a reverse flow queue from a perspective sent from a receiver back to the forwarder and returning allocated memory for the dropped packet to the system;
   prioritizing a first packet to be sent to the forwarder from the sender if the reverse flow queue from the receiver to the forwarder is determined not to include the first packet;
   Selective Acknowledgments (SACK) examining to examine SACK blocks of the forwarder to selectively drop packets in the forward flow queue based on the reverse flow queue; and
   MultiPath Transmission Control Protocol (MPTCP) examining configured to examine multipath headers to recognize MPTCP flows and examine the reverse flow queue to determine if redundant data has been sent such that the dropping drops the redundant data,
   wherein the dropping drops the packet in the forward flow queue from the perspective sent from the forwarder to the receiver if the metadata of the packet does not match the metadata of the acknowledged packet.

9. A non-transitory computer-readable recording medium recording a queue management program, the program causing a computer to perform:
   Selective Acknowledgments (SACK) examining to examine SACK blocks of a forwarder to selectively drop packets in a forward flow queue based on a reverse flow queue; and MultiPath Transmission Control Protocol (MPTCP) examining configured to examine multipath headers to recognize MPTCP flows and examine the reverse flow queue to determine if redundant data has been sent based on a comparison between two subflows being a part of a same superflow, wherein a packet in the forward flow queue from a prior transmission is dropped from the perspective sent from the forwarder to the receiver if a metadata of the packet does not match a metadata of an acknowledged packet in the reverse flow queue, further comprising:

extracting acknowledgement information from arriving packets in the forward flow queue at the forwarder; and examining the reverse flow queue from the forwarder for the acknowledged packet based on the acknowledgement information.

10. The non-transitory computer-readable recording medium of claim 9, wherein the first packet is prioritized when a triple acknowledgement is detected for the first packet.

* * * * *